(12) United States Patent
Suraqui

(10) Patent No.: US 7,199,786 B2
(45) Date of Patent: Apr. 3, 2007

(54) REDUCED KEYBOARDS SYSTEM USING UNISTROKE INPUT AND HAVING AUTOMATIC DISAMBIGUATING AND A RECOGNITION METHOD USING SAID SYSTEM

(76) Inventor: Daniel Suraqui, Yam Soul 6/b, Apt. 15 Ramat Eskol, Jerusalem (IL) 97701

( * ) Notice: Subject to any disclaimer, the term of this patent is extended or adjusted under 35 U.S.C. 154(b) by 530 days.

(21) Appl. No.: 10/706,031

(22) Filed: Nov. 13, 2003

(65) Prior Publication Data

US 2004/0104896 A1    Jun. 3, 2004

Related U.S. Application Data

(60) Provisional application No. 60/430,338, filed on Nov. 29, 2002, provisional application No. 60/505,724, filed on Sep. 22, 2003.

(51) Int. Cl.
*G09G 5/00* (2006.01)

(52) U.S. Cl. ........................ 345/168; 345/173; 345/179

(58) Field of Classification Search ................ 345/168, 345/173, 179
See application file for complete search history.

(56) References Cited

U.S. PATENT DOCUMENTS

| | | | | |
|---|---|---|---|---|
| 3,945,482 | A * | 3/1976 | Einbinder | 400/486 |
| 4,211,497 | A | 7/1980 | Montgomery | |
| 5,156,475 | A * | 10/1992 | Zilberman | 400/472 |
| 5,574,482 | A * | 11/1996 | Niemeier | 345/173 |
| 6,298,146 | B1 * | 10/2001 | Ilan et al. | 382/115 |
| 6,307,549 | B1 | 10/2001 | King | |
| 6,810,271 | B1 * | 10/2004 | Wood et al. | 455/566 |
| 2003/0009673 | A1 * | 1/2003 | Hayashi et al. | 713/176 |

(Continued)

OTHER PUBLICATIONS

Zhai Shumin & Kristensson Per-Ola, Shorthand Writing on Stylus Keyboard, CHI 2003, ACM Conference on Human Factors In Computing Systems, CHI Letters, Apr. 2003, Ft. Lauderdale, Florida, USA—First page is presented.

(Continued)

*Primary Examiner*—Richard Hjerpe
*Assistant Examiner*—Leonid Shapiro
(74) *Attorney, Agent, or Firm*—Edward Langer; Shiboleth Yisraeli Roberts Zisman & Co.

(57) ABSTRACT

A reduced keyboard system for text input on electronic devices, mainly for use with handheld touchscreen devices, comprising a virtual keyboard and an input device. The keyboard is preferably circular with three concentric circles. Text input is by placing the input device onto the key of the keyboard that corresponds to the first character of a word, sliding the input device to subsequent keys corresponding to subsequent characters of a word, and lifting the input device from the keyboard, producing a bi-dimensional input pattern. Keystrokes can be used instead of sliding motion in this case the input pattern is generated from the clicked keys. The system comprises a dictionary database comprising a plurality of classes containing words that have first and last letters corresponding to predetermined keys of the keyboard. The bi-dimensional input pattern produced is used to determine the identity of the inputted word at least partially based on comparison between the bi-dimensional input pattern and patterns generated from words contained within the class of the dictionary database to which the inputted word belongs. Word identification is performed using a powerful pattern recognition algorithm based on the mathematical concept of monotonicity, which is disclosed.

31 Claims, 8 Drawing Sheets

U.S. PATENT DOCUMENTS

| | | | |
|---|---|---|---|
| 2003/0165801 A1* | 9/2003 | Levy | 434/227 |
| 2004/0120583 A1 | 6/2004 | Zhai | |
| 2004/0140956 A1 | 7/2004 | Kushler | |
| 2005/0052406 A1 | 3/2005 | Stephanick | |
| 2005/0190973 A1 | 9/2005 | Kristensson | |
| 2006/0055669 A1 | 3/2006 | Das | |

OTHER PUBLICATIONS

Mackenzie, I. Scott & Soukoreff, R. William, Text Entry for Mobile Computing: Models and Methods, Theory and Practice, Human-Computer Interaction. 2002. vol. 17, pp. 147-198Copyright © 2002, Lawrence Erlbaum Associates, Inc.—First page presented.

Mankoff Jennifer, and Abowd Gregory, A word-level unistroke keyboard for pen input, Proc. ACM UIST, Tech. Note. 1998. p. 213-214.

Bohan, M., Phipps and others, A psychophysical comparison of two stylus-driven soft keyboards, Graphics Interface '99, pp. 92-97. Toronto: Canadian Information Proc. Society.

Guttman Louis, Polytonicity and monotonicity Coefficients of, Encyclopedia of Statistical Sciences, N.Y.: John Wiley & Sons, Inc., 1986, 7, pp. 80-87.

Guttman Louis, What Is not what In statistics, The Statistician, 1977, 26, pp. 81-107—first page is presented.

* cited by examiner

FIG. 3
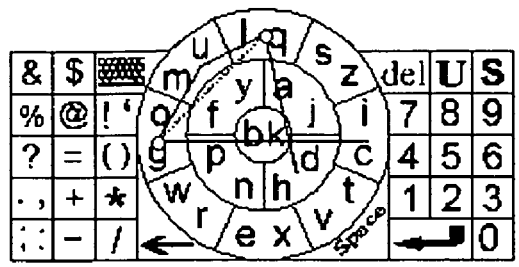
FIG. 4A
| z | v | c | h | w | k |
|---|---|---|---|---|---|
| f | i | t | a | l | y |
| space | | n | e | space | |
| g | d | o | r | s | b |
| q | j | u | m | p | x |
FIG. 4B
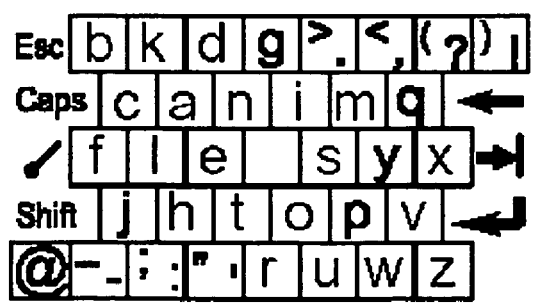

FIG. 8
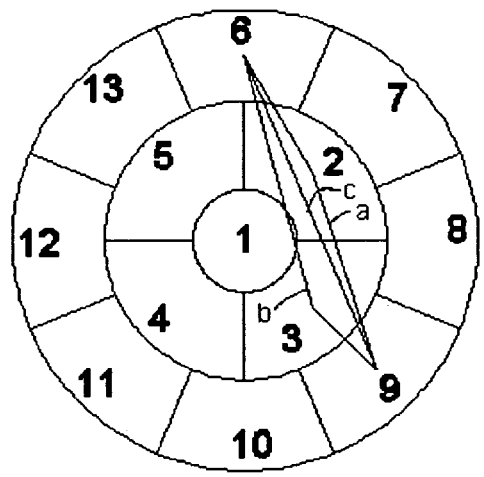
FIG. 9A
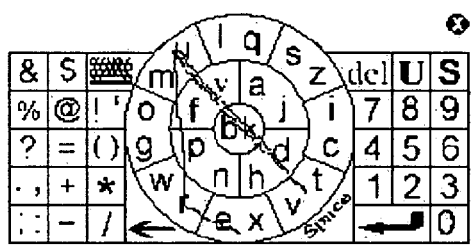
FIG. 9B
FIG. 9C
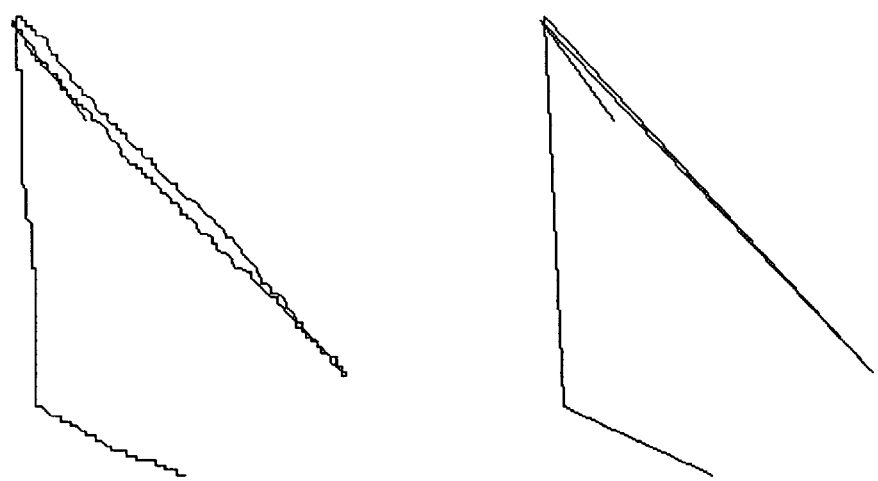

REDUCED KEYBOARDS SYSTEM USING UNISTROKE INPUT AND HAVING AUTOMATIC DISAMBIGUATING AND A RECOGNITION METHOD USING SAID SYSTEM

RELATIONSHIP WITH OTHER APPLICATION

This application claims priority from U.S. Provisional application Ser. No. 60/430,338, filed Nov. 29, 2002 and from U.S. Provisional application Ser. No. 60/505,724, filed Sep. 22, 2003.

FIELD OF THE INVENTION

The present invention relates generally to the field of mobile and handheld electronic devices. More specifically, the present invention relates to reduced keyboards system and method that is useful for all types of electronic devices that employ text input. The present invention has the advantage of providing a high-speed and accurate text input system that has a relatively compact keyboard area and that has automatic disambiguating capabilities due to new pattern recognition method. It is applicable for all keyboards known in the art, however it is most efficient when used with a specific preferred embodiment, to be described.

BACKGROUND OF INVENTION AND DESCRIPTION OF PRIOR ART

Text entry for mobile and handheld devices represents a field that is developing at a very fast pace. With the continuously decreasing size of PDA's and other devices, the main challenge of text entry has been the need for a compact keyboard area that does not compromise on the input speed or accuracy of the system. Devices that have built-in hardware keyboards do not allow for fast text input, since the keys on the keyboard are very small. Hand-writing recognition systems are highly dependent on the input quality and do not provide the desired level of speed and accuracy. In systems such as the Palm Pilot (developed by Palm Inc., Santa Clara Calif.), the user must first learn a unique alphabet, and even once this is mastered, the input speed is highly limited.

The use of keyboards having multiple characters on each key, for reducing the overall size of the keyboard, is known. U.S. Pat. No. 6,307,549 to King et al., hereby incorporated by reference, relates to a reduced keyboard disambiguating system having a keyboard with a reduced number of keys. A plurality of letters and symbols are assigned to a set of data keys so that keystrokes entered by a user are ambiguous. Due to the ambiguity in each keystroke, an entered keystroke sequence could match a number of words with the same number of letters. The disambiguating system includes a memory having a number of vocabulary modules. The vocabulary modules contain a library of objects that are each associated with a keystroke sequence. Each object is also associated with a frequency of use. Objects within the vocabulary modules that match the entered keystroke sequence are identified by the disambiguating system. Objects associated with a keystroke sequence that match the entered keystroke sequence are displayed to the user in a selection list. The main drawback to this invention is that it is mainly suitable for use for a telephone keypad. For use in other hand-held and mobile electronic devices, the input speed is too limited for the system to work effectively and the accuracy of the system is relatively low (for example, see Bohan (Bohan, M., Phipps, C. A., Chaparro, A., & Halcomb, C. G. (1999). A psychophysical comparison of two stylus-driven soft keyboards. *Proceedings of Graphics Interface '99*, 92–97. Toronto: Canadian Information Processing Society), disclosing a virtual keyboard adaptation for PDA's which was found to be slower than the QWERTY layout).

Other known systems employ a virtual keyboard, in which the user slides a stylus or other input device from one letter to the next in order to form a word. *Quickwriting* (Perlin K., "Quickwriting: Continuous Stylus-Based Text Entry". Proc. ACM UIST, Tech. Note. 1998) uses such a sliding motion, but is limited in its capabilities because it requires that the stylus be returned to the center of the keyboard after each letter is inputted. Thus, producing a single word can be complex. Niemeier, in U.S. Pat. No. 5,574,482, hereby incorporated by reference, also uses a sliding motion for text input mainly for word prediction. Once a letter has been recognized, the system generates additional temporary keys based on the predicted next letter, in order to reduce the input time.

The Cirrin keyboard system (Mankoff, J. and G. D. Abowd. Cirrin: a word-level unistroke keyboard for pen input. Proc. ACM UIST, Tech. Note. 1998. p. 213–214.), (see FIG. 1G) uses a sliding motion on a annulus keyboard that is composed of 26 letters. At the end of the word, the stylus is lifted and a space is automatically created. Cirrin operates at a word level, and it does not require a dictionary. However, Cirrin is very slow, because the annulus circumference is large (26 letters) and because after each letter (or in some cases, series of letters), the stylus has to leave the annulus area so that the inputted character can be identified.

MessageEase (www.exideas.com) uses a nine-key keyboard. Disambiguation of words is obtained by a small sliding inside the key area in order to determinate the selected character. A nine-key text entry method allows for the selection characters by moving a cursor, though this method is not very fast because it requires two keystrokes for certain letters. Other text entry systems that have been developed are described in the following article, which is hereby incorporated by reference:

MacKenzie, I. S., & Soukoreff, R. W. (2002) "Text Entry for Mobile Computing: Models and Methods, Theory and Practice". *Human-Computer Interaction*, 17, 147–198.

The idea of using sliding motion to generate a trajectory, which allows for the recognition of the inputted word, was described in U.S. Provisional Patent Application 60/430,33 (November 2002) (to the inventor of the present invention), to which the present application claims priority. More recently, a similar idea was set forth (Zhai, S., & Kristensson P., (April 2003) "Shorthand Writing on Stylus Keyboard"). In this system, a pattern dictionary of the 100 most common English words is generated from the ATOMIK keyboard, and users learn the shorthand symbol corresponding to each of those words according to its movement pattern on the keyboard. In order to maximize input speed, this method is designed to recognize patterns independently of location and scaling. The authors do not, however, employ the possibility to tracing patterns directly from the ATOMIK keyboard layout, because, using their system, this would require too much visual attention, thus resulting in a slower text input time. This remark will not apply for some preferred embodiments of the invention, as it will be clearly shown in the following sections.

OBJECTS AND ADVANTAGES OF THE PRESENT INVENTION

As it will be appreciated from the description provided, the present invention is the first text input recognition system for a virtual keyboard that effectively utilizes the bi-dimensional input pattern produced when a word is inputted (using a sliding motion) in order to achieve word recognition using a powerful and unique pattern recognition system. The system does not rely on the instantaneous identification of the individual letters of a word, as do other systems in the art. Furthermore, the present invention provides for a unique virtual keyboard layout which maximizes the effectiveness of the method, though other known keyboards could be employed as well. The method and system of the present invention allow for a relatively fast text input time, as a result of the smaller area of the keyboard, and because, preferably, each key of the keyboard represents more than one letter of the alphabet. The system is equipped with disambiguation capabilities to recognize the inputted word despite the fact that there is ambiguity in desired inputted letter, since in most preferred embodiments, some keys of the keyboard represent more than one letter. The system also handles ambiguities resulting from similar input patterns for different words (for example, the words "or" and "our" on the QWERTY keyboard.) These and other features and advantages of the present invention will become more clearly understood and appreciated from the description that follows.

SUMMARY OF THE INVENTION

The present invention relates to a reduced keyboard system for text input on an electronic device, comprising;
  (a) a virtual keyboard comprising a plurality of keys;
  (b) an input device associated with said virtual keyboard, wherein text input is performed by placing said input device onto the virtual key of said virtual keyboard that corresponds to the first character of a word, sliding said input device to subsequent virtual keys corresponding to subsequent characters of a word, and lifting the input device from the virtual keyboard so as to produce a bi-dimensional input pattern (this is referred to as a "unistroke" motion, in contrast to the conventional "keystroke", where single keys are pressed one at a time), and;
  (c) a dictionary database associated with the virtual keyboard, said dictionary database comprising a plurality of classes wherein each class contain words that have first and last letters corresponding to predetermined keys of the virtual keyboard;

The bi-dimensional input pattern is used in order to determine the identity of the inputted word based on comparison between said bi-dimensional input pattern and patterns generated from words contained within the class of said dictionary database to which the inputted word belongs. Once a bi-dimensional pattern is produced, the system automatically checks for the first and last coordinates of the inputted pattern, thus indicating the characters (or character pair, triple, etc . . . in cases where the keys contain more than one character each) that make up the first and last letter of the inputted word. The class of the dictionary database to which the inputted word belongs can then be identified. For keyboards in which each key corresponds to one letter (for example, the QWERTY keyboard), a class may be, for example, class s-h (this class would include all words starting with the letter s and ending with letter h belong to this class). In cases where the keyboard contains keys that correspond to two characters of the alphabet, the class may be, for example, dh-np. In such a case, all words starting with the letter d or h and ending with the letter n or p belong to this class.

In the context of the present invention, the term "reduced" keyboard system is meant to imply that the keyboard has a reduced area, so as to enable usage in small electronic devices and to minimize the sliding motion without compromising on text input speed or word recognition accuracy.

According to preferred embodiments of the present invention, the keyboard has a QWERTY arrangement. In order to reduce the number of word ambiguities resulting from the usage of the standard QWERTY keyboard, the keyboard is preferably configured in a convex or concave manner.

Further according to preferred embodiments of the present invention, at least one of the keys of the virtual keyboard contains two characters. This feature serves to substantially reduce the input time required for entering a word, though it does introduce more word ambiguity, since for a given key, the desired letter could be one of two possibilities. As it will be appreciated further, the system for the present invention has been designed to automatically solve (or "disambiguate") such ambiguities.

Additionally according to preferred embodiment of the present invention, the keyboard comprises a 6×5 key array (30 keys total). Alternatively, the keyboard comprises a 4×4 key array (16 keys total). These will be further described and appreciated in the detailed description of the invention section that follows.

Still further according to preferred embodiments of the present invention, the virtual keyboard has a substantially circular shape. The circular shape serves to substantially reduce the number of word ambiguities, to reduce the unistroke path and to enable usage of any number of keys.

Additionally according to preferred embodiments of the present invention, the keyboard comprises a plurality of concentric circles. Preferably, there are two or three concentric circles. In one preferred embodiment, the keyboard comprises 13 keys, and the concentric circles comprise an outer circle having 8 keys, a middle circle having 4 keys, and an inner circle having one key. Preferably, each of the keys corresponds to two characters of the alphabet. In one configuration, the alphabet characters are arranged into keys according to the following couples: l,q;s,z;i,c;t,v;x,e;r,w;g, o;m,u;a,j;d,h;n,p;f,y; and b,k. The outer circle preferably comprises the letter couples: l,q;s,z;i,c;t,v;x,e;r,w;g,o; and m,u. The middle circle preferably comprises the letter couples a,j;d,h;n,p; and f,y The inner circle preferably comprises the letter couple b,k. It is appreciated that other letter pairs and positioning of letter pairs are possible, all of which are encompassed by the scope of the present invention.

One advantage of concentric circles is that its design allows for the usage of any number of keys and for the placement of any suitable number of keys on each concentric circle. Using a rectangle or square-shaped keyboard, the number of keys is dependent on the keyboard dimensions. A 6×5 keyboard has 30 keys, and a 4×4 keyboard has 16 keys (in order to obtain 13 keys with a square keyboard, one would have to use a 4×4 keyboard with three empty keys or fill those keys with non alphabetical symbols). Another advantage is that all the letters belonging to a given circle are equivalent due to the perfect symmetry of the circle. In a square or a rectangle keyboard the four keys which define the keyboard corners are "disadvantaged". This is why they are generally filled with low frequency letters. Finally, when performing a sliding motion on a 6×5 keyboard, part of the keyboard can be occluded by the hand, thus disturbing the motion. This negative feature does not happen on a circular keyboard, which is always entirely visible.

In another preferred embodiment of the present invention, the keyboard comprises 16 keys. The concentric circles comprise an outer circle having 10 keys, a middle circle having 5 keys, and an inner circle having one key.

According to preferred embodiments of the present invention, the input device is selected from the group consisting of: a mouse, a pen digitizer, a stylus, a human finger, and a graphic tablet. It is appreciated that the system of the present invention may be useful for any electronic device using text input such as a PC, PDA, mobile phone, etc . . . . The system of the present invention allows for fast and efficient text input on a virtual keyboard which has a reduced size, so as to enable usage in almost any handheld or portable device.

Further according to preferred embodiments of the present invention, words belonging to a specific class of the dictionary database are ordered according to curvilinear length.

Preferably, the system of the present invention is also supplied with means for applying a line simplification algorithm to the bi-dimensional input pattern for facilitating word recognition by comparison with words from a specific dictionary class.

Still further according to preferred embodiments of the present invention, the system further comprises means for segmenting (the bi-dimensional input pattern into monotonous segments, as well as with means for computing the matching distance between the bi-dimensional input pattern and patterns generated from a plurality of words to the dictionary database class to which the inputted word belongs. This pattern recognition system will be explained further in the detailed description of the drawings section that follows.

Additionally according to preferred embodiments of the present invention, the system further comprises means for determining possible intermediate letter candidates of the inputted word. It will be appreciated that the determination of intermediate letters allows for mistakes on the part of the user, as occur when a neighboring key is crossed instead of the intended key, during the unistroke motion.

Moreover according to preferred embodiments of the present invention, the system further comprises means for allowing the user to update the dictionary database with a new word, or to suppress a word from the dictionary database. These functions may be performed either on a temporary or a permanent basis.

Further according to preferred embodiments of the present invention, the system comprises means for allowing the user to use the keyboard as a conventional keystroke keyboard.

The system preferably operates in a keystroke mode whenever a single key is touched and the input device is subsequently lifted. In this case, two input methods are possible: 1) the "red light" feature, in which the user clicks above the desired letter and the letter is automatically displayed; 2) the "green light" feature, in which the system registers each individual key which was tapped, and a bi-dimensional input pattern is created from the individual keystrokes so as to enable recognition of the entered word. The "green light" feature is a faster input method than the "red light" because the user need not tap above a specific letter but only on the key containing the desired letter. The user can switch between the "green light" and "red light" input methods as desired by pressing a predetermined key on the keyboard. It is appreciated that the features described above could be identified by other names as well, and that the terms "green light" and "red light" have been chosen for the sake of clarity and consistency only. It is appreciated that the present invention is meant to encompass also hardware keyboards which are capable of functioning in the above-mentioned "green light" input method. Thus, each key may have more than one letters assigned thereto. To input a word, the proper keys are keystroked and then the system generates a bi-dimensional input pattern of the inputted word in order to facilitate word recognition.

It is appreciated that the unistroke and keystroke features are totally compatible with one another, and the user can choose, at any time, which input method to use, (when the user performs a sliding motion on the sliding area, the system responds accordingly without the previous need to press any special key). This is especially advantageous while the user is still gaining familiarity with the keyboard layout and the unistroke motion (for more common words, a unistroke motion will be used, whereas for less common words, the keystroke preferably with "green light" feature will be used until sufficient mastery of the system is achieved).

Still further according to preferred embodiments of the present invention, the system comprises means for displaying a first-choice solution to the user on the virtual keyboard. The first-choice solution is preferably displayed on the center of the virtual keyboard (though other suitable locations may be employed as well) in large blue letters (other colors may be employed as well). Thus, since the solution is displayed directly on the center of the keyboard, the user need not look up to the display screen associated with the electronic device in order to check that the word added is the correct word. When non first-choice solutions exist, these solutions are preferably also displayed directly on the virtual keyboard, so the user can easily choose a second-choice solution, if the first-choice solution is incorrect. A non first-choice solution may be selected, for example, by touching the input device on the desired word. If the first-choice solution is correct, the user simply continues to the next word to be inputted, and said first-choice solution is automatically added to the text. It is appreciated that this presentation allows the user to focus only on the keyboard and not on the text, thus contributing to the speed and comfort. It is also appreciated that the first-choice solution may be displayed at other suitable locations on the keyboard, in addition to the center of said keyboard.

Preferably, the system is also provided with means for allowing the user to delete the last created word a word from the generated text.

The present invention also relates to a method for text input on an electronic device, using a reduced virtual keyboard associated with said electronic device, comprising;

(a) placing an input device onto the virtual key of a reduced virtual keyboard that corresponds to the first character of a word, sliding said input device to subsequent virtual keys corresponding to subsequent characters of said word, and lifting said input device from said virtual keyboard so as to produce a bi-dimensional input pattern;

(b) providing a dictionary database associated with said virtual keyboard, said dictionary database comprising a plurality of classes wherein each of said classes contain words that have first and last letters corresponding to predetermined keys of said virtual keyboard;

(c) comparing said bi-dimensional input pattern with patterns generated from words belonging to the class of said dictionary database to which the inputted word belongs, and;

(d) identifying at least one solution for the inputted word based on the comparison carried out in step (c).

The aforementioned process is repeated for each word that is to be inputted.

According to preferred embodiments of the present invention, the method further comprises displaying said at least one solution to the user on the virtual keyboard. In cases where there is more than one possible solution, the solution with the greatest probability is displayed in a first-choice solution location on the keyboard and non first-choice solution are displayed in a separate location on the keyboard. Thus, the user need not look up to the display screen associated with the electronic device. If the user proceeds to input the next word, then the previous word first-choice solution is removed from the keyboard display and is automatically entered into the text. When a non-first choice solution is selected by the user, this solution is entered as the next word in the text. It is estimated that in more than 95% of all cases, the first-choice word solution is the correct word. In about 4% of cases, the second choice is the solution, and in about 1% of all cases, the solution belongs to the multiple choices list. There may be a few rare situations when the word is not included into the dictionary or is not recognized and sliding has to be repeated, or the word has to be inputted conventionally using keystrokes.

Further according to preferred embodiments of the present invention, words belonging to a specific class of the dictionary database are ordered according to increasing (or alternatively, decreasing) curvilinear length.

Still further according to preferred embodiments of the present invention, the method also comprises applying a line simplification algorithm to the bi-dimensional input pattern.

Additionally according to preferred embodiments of the present invention, the method also comprises segmenting the bi-dimensional input pattern into monotonous segments.

Moreover according to preferred embodiments of the present invention, the method further comprises computing the matching distance using a pattern recognition system (to be further described in the detailed description section) between the bi-dimensional input pattern and patterns generated from a plurality of words belonging to the dictionary database class to which the inputted word belongs (the class to which the inputted word belongs may be readily determined using the first and last coordinates of the bi-dimensional input pattern).

Further according to preferred embodiments of the present invention, the method also comprises determining possible intermediate letter candidates of the inputted word. Preferably, this step involves a high degree of tolerance, such that keys neighboring those passed through by the trajectory of the bi-dimensional input pattern, can also be considered, within a predetermined tolerance level, to represent possible letter candidates.

Still further according to preferred embodiments of the present invention, the method also comprises applying geometrical filters to bi-dimensional input pattern. Preferably, geometrical filters that are applied include the curvilinear length, the largest distance between two keys, and the minimum and/or maximum X and/or Y coordinates of the bi-dimensional curve. Such geometrical filters further serve to reduce the number of candidates, from the word candidates in a given dictionary class, to which the inputted word corresponds. It is appreciated, however, that it may not always be necessary to apply geometrical filters (in some preferred embodiments, only one or two filters are applied). This step, as well as the previous steps that were mentioned, will become more readily understood from the detailed description of the drawings section.

According to preferred embodiments of the present invention, the virtual keyboard has a QWERTY arrangement. Said keyboard preferably has concave or convex curvature (to any appropriate angle) for minimizing the number of word ambiguities.

Additionally according to preferred embodiment of the present invention, the keyboard comprises a 6×5 key array (30 keys total). Alternatively, the keyboard comprises a 4×4 key array (16 keys total). These will be further described and appreciated in the detailed description of the invention section that follows.

Further according to preferred embodiments of the present invention, at least one of the keys of said virtual keyboard contains two characters.

Still further according to preferred embodiments of the present invention, the virtual keyboard has a substantially circular shape.

In another preferred embodiment of the present invention, a method is provided to determine the letters location which optimize the number of ambiguities as well as the trajectory of the unistroke path. This method can be applied to any circular, square or rectangle keyboard having or not a plurality of letters per key.

Additionally according to preferred embodiments of the present invention, the keyboard comprises a plurality of concentric circles. Preferably, there are two or three concentric circles. In one preferred embodiment, the keyboard comprises 13 keys, and the concentric circles comprise an outer circle having 8 keys, a middle circle having 4 keys, and an inner circle having one key. Preferably, each of the keys corresponds to two characters of the alphabet. In one configuration, the alphabet characters are arranged into keys according to the following couples: l,q;s,z;i,c;t,v;x,e;r,w;g, o;m,u;a,j;d,h;n,p;f,y; and b,k. The outer circle preferably comprises the letter couples: l,q;s,z;i,c;t,v;x,e;r,w;g,o; and m,u. The middle circle preferably comprises the letter couples a,j;d,h;n,p; and f,y. The inner circle preferably comprises the letter couple b,k. It is appreciated that other letter pairs and positioning of letter pairs are possible.

In another preferred embodiment of the present invention, the keyboard comprises 16 keys. The concentric circles comprise an outer circle having 10 keys, a middle circle having 5 keys, and an inner circle having one key.

According to preferred embodiments of the present invention, the input device is selected from the group consisting of: a mouse, a pen digitizer, a stylus, a human finger, and a graphic tablet. It is appreciated that the system of the present invention may be useful for any electronic device using text input such as a PC, PDA, mobile phone, etc . . . . The dictionary database preferably comprises an English dictionary containing about 77,000 words including the inflected forms: (i.e. work, works, worked, working, . . . ) of each word. It is appreciated that the present invention could be adapted for use with languages other than English as well.

Capitalization is preferably obtained by sliding gently on the letter area. Other appropriate means could also be employed for enabling capitalization.

Preferably, the first letter after a period is automatically capitalized. Preferably, when words are generated with sliding motion the words are displayed with the same spelling and capital letters corresponding to the ones of the dictionary.

It is appreciated that the reduced keyboard system and method of the present invention is useful for all types of text input, including SMS, email, documentation, etc . . . and that it can work on virtually any platform. Since the system allows for a high level of tolerance, text written with very poor vocabulary and with very sophisticated vocabulary can both be easily deciphered. The system automatically corrects some spelling errors ("s" instead of "z" for example, double letters etc . . . ) as well as parallax errors and intermediate key errors, and also allows the user to modify the dictionary database according to his own preferences. The user need not learn a special alphabet in order to input a word; words are inputted using fast, easy, sliding motions (or gestures). The user can also use the keyboard in a conventional keystroke manner, if desired. As the user becomes more familiar with the keyboard layout, he can input words at a very fast pace using the sliding motion. Because of its word disambiguating method based on a unique pattern recognition method, the system of the present invention has a very high recognition ratio. In those cases where the first-choice solution is not correct, the user can easily select a second choice solution without looking up at the display screen.

BRIEF DESCRIPTION OF THE DRAWINGS

The present invention will now be described in detail, with reference to the accompanying Figures, wherein:

FIGS. 1B–1D illustrate schematic drawings of alternative angle displacements for the concentric circles comprising the keyboard illustrated in FIG. 1A. FIGS. 1E and 1F illustrate schematic drawings of two further preferred embodiments of the keyboard of the present invention, wherein said keyboard comprises two concentric circles.

FIG. 3 illustrates the ambiguity resulting from similar bi-dimensional input patterns for the word "could" and the word "cold" using the keyboard of FIG. 1A.

FIG. 4A and FIG. 4B illustrate schematic views of alternative types of keyboard configurations comprised of 6×5 key arrays. The keyboard in FIG. 4A is the Fitaly (Textware Solutions, refer to U.S. Pat. No. 5,487,616, hereby incorporated by reference) keyboard and the keyboard in FIG. 4B is the Atomik (IBM Corporation) keyboard.

FIG. 8 illustrates a schematic drawing of a 13-key virtual keyboard, showing how an ambiguity may arise.

FIGS. 9A, 9B, and 9C illustrate schematic drawings of the application of a line simplification algorithm to the bi-dimensional input pattern for the word "future", as produced using the keyboard of FIG. 1A. FIG. 9A shows the bi-dimensional input pattern on the keyboard. FIG. 9B shows the bi-dimensional input pattern prior to line simplification, and FIG. 9C shows the bi-dimensional input pattern following line simplification.

FIG. 10A shows the bi-dimensional input pattern as it is inputted onto the keyboard of FIG. 6A. FIG. 10B shows the generated bi-dimensional pattern with boundary points. FIG. 10C, FIG. 10D, and FIG. 10E show the three monotonous segments for the corresponding generated pattern.

FIGS. 11A and 11B are the bi-dimensional pattern candidate and for the inputted word and for the library, respectively. FIGS. 11C, 11D, and 11E show the three monotonous segments for the inputted word pattern compared to those of the library candidate pattern.

DETAILED DESCRIPTION OF PREFERRED EMBODIMENTS

It is appreciated that the detailed description provided is meant only to illustrate certain preferred embodiments of the present invention. It is in no way intended to limit the scope of the invention, as set out in the claims.

In the context of the present invention, the term "sliding area" is meant to refer to the portion of a keyboard that contains alphabetic letters.

Figure 1A:
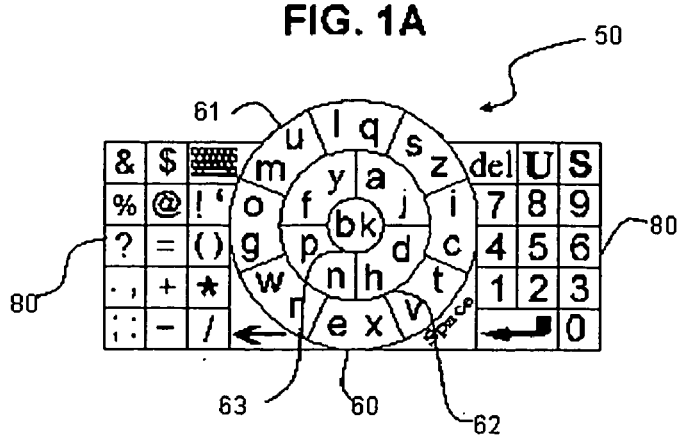
FIG. 1A illustrates a schematic drawing of a preferred embodiment of the keyboard of the present invention, comprising 13 keys, and three concentric circles, wherein each key presents one letter pair.
Figure 1A:
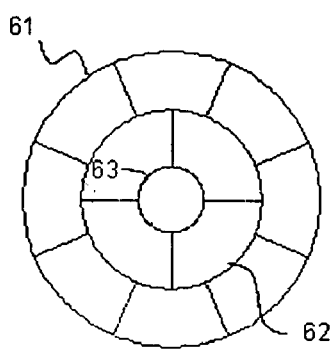
Figure 1A:
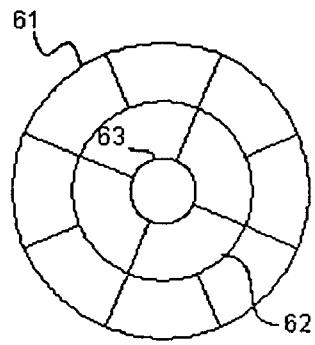
Figure 1A:
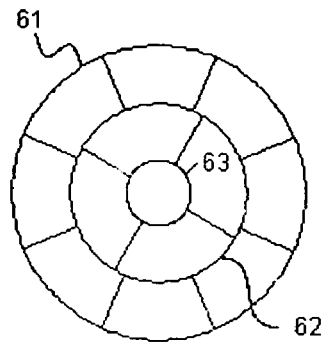
Figure 1A:
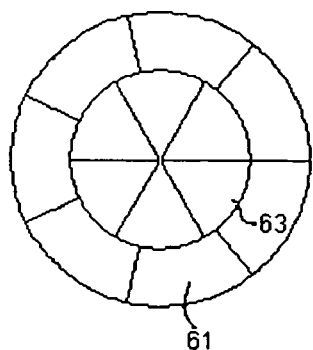
Figure 1A:
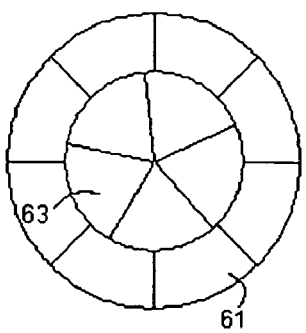
Figure 1G:
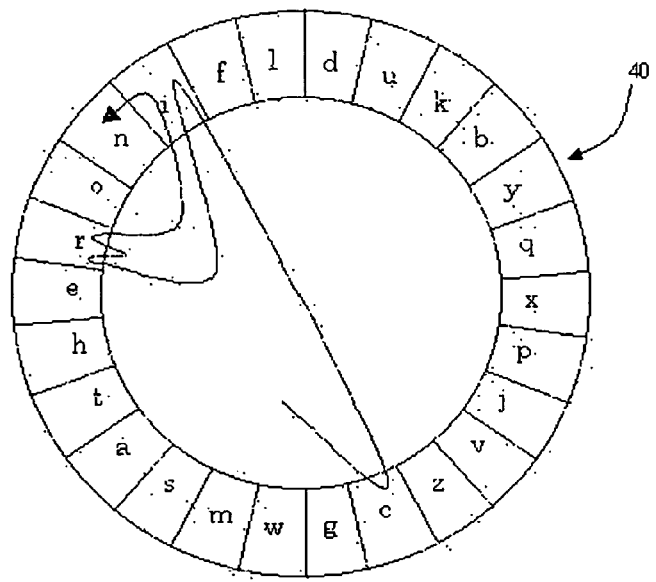
FIG. 1G is a schematic drawing of the known Cirrin keyboard, with the word "cirrin" input using a unistroke motion.
Figure 1H:
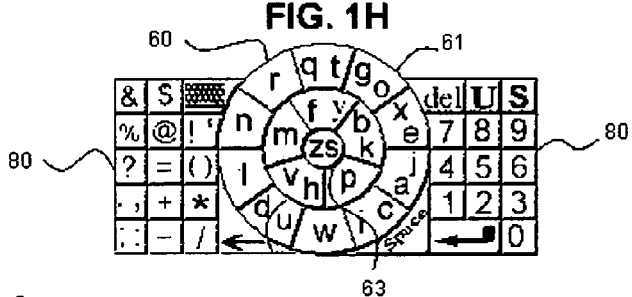
FIG. 1H is a schematic drawing of an alternative preferred embodiment of the keyboard of the present invention, in which the keyboard comprises 16 keys.

Referring first to FIG. 1A, the virtual keyboard (50) of the present invention preferably comprises a circular sliding area (60), wherein the letters of the alphabet are located, in couples, on three concentric circles. An outer circle (61) contains 8 virtual keys; a middle circle (62) contains 4 virtual keys; and an inner circle (63) contains one key. Letters are coupled and positioned as seen in the Figure, though it is appreciated that other configurations are possible as well. Preferably, the virtual keyboard (50) of the present invention is further supplied with other ASCII symbols and digits 0–9 on an outer area (80) located outside of the concentric circles. In the 16 keys virtual keyboard shown in FIG. 1H, the sliding area (60) is also comprised of three circular regions (61) (62) (63), in which sliding motion is allowed. The preferable displacement angle between the outer circle (61), and the middle circle (62) is 45 degrees (a displacement angle of 45 degrees is shown in FIGS. 1A and 1B). Alternative displacement angles of 0 degrees and 15 degrees are illustrated in FIGS. 1C and 1D, respectively, though it is appreciated that the preferred angle is 45 degrees.

FIGS. 1E and 1F illustrate a virtual keyboard having two concentric circles: an outer circle (61) and an inner circle (63). Both layouts shown have a total of 13 alphabetic keys, as does the preferred embodiment shown in FIG. 1A. In FIG. 1E, the outer circle (61) comprises 7 keys, and the inner circle (63) comprises 6 keys. In FIG. 1F, the outer circle (61) comprises 8 keys, and the inner circle (63) comprises 5 keys. Such variations are illustrated so that the reader will appreciate that there are many different possible configurations for the virtual keyboard of the present invention, all of which fall within the scope of the invention. However, the configuration shown in FIG. 1A is the most preferable embodiment and thus, the ensuing discussion will be directed mainly towards this embodiment. Other keyboard layouts will be described as well. It is again stressed, however, that the embodiment illustrated in FIG. 1A has been shown to work the most effectively, and to provide the best text input speed and accuracy, in comparison to the other keyboard layouts which were tested.

When the keyboard is activated, a visual development tool program displays the keyboard and looks for the active application in which the user intends to write (editor, email, etc . . . ). If no active application exists, a default application is loaded. The program next calls the module that reads and arranges the dictionary. The dictionary is arranged according the number of keys. For a 13-key keyboard (2 characters per key), there are 13×13, or 169 classes. Classes are arranged according to first and last key. For a 26-key, single character per key, keyboard, there are 26×26=676 classes.

When the user slides on the keyboard area and the input device is subsequently lifted from the screen, the coordinates of the bi-dimensional input pattern produced are transmitted to the executable module, which returns the recognized ASCII word. The number of points of the input pattern are minimized using the Douglas-Peucker line simplification algorithm (Douglas, D. H. and Peucker, T. K, 1973, 'Algorithms for the reduction of the number of points required to represent a digitized line or its caricature', The Canadian Cartographer 10 (2), 112–122). The first and last letter possibilities of the inputted word is determined by the coordinates of the first and last points of the input pattern. The user must initially place the input device on the first letter key area and later, lift the input device from on the last letter key area; otherwise the word will not be recognized (preferably, using the 13-key keyboard of FIG. 1A, no neighboring keys are taken into account in order not to increase the number of ambiguities, though with the QWERTY (FIG. 6A) and 6×5 key array keyboards (FIGS. 4A and 4B), this is not the case).

Once the class of the dictionary to which the inputted word belongs is identified, geometrical filters are applied to the bi-dimensional input pattern in order to eliminate words of the selected class. For example, for the keyboard of FIG. 1A, two filters are preferably used: curvilinear length of the trajectory, and the maximum length separating two points of the trajectory. It will be seen later that an additional filter based on intermediary letters can be also used. These two parameters are compared with their counterpart values for patterns generated from words in the corresponding dictionary class. This filtering operation is extremely fast because all the parameters of the filters are read from the database (and stored in the memory) when the system is initiated. Large tolerances allowing geometrical distortions are used.

M0 is the number of possible candidates remaining from the class after the above filtering process. When M0=0, the non-recognition of the word is stated. When M0>10, intermediate letters as an additional filter are looked for (as to be described).

An intermediate letter is defined by the angle that it forms with the previous key and next key. When the angle is smaller than 1.40 rd, the key is considered as an intermediate (in cases where the key corresponds to two letters, both letters are considered as possible intermediate letters of the word). In some preferred embodiments, neighboring keys are also candidates for intermediate letters. A combinatory loop taking into account all the possibilities of intermediate letters selects, from the M0 list of words, the ones having the same set of intermediate letters. M1 is the resulting list of words after this process. Due to real time considerations, the above combinatory number cannot exceed 25,000 (if it does, then the number of intermediates letters is reduced). When no intermediate letters are detected, M1=M0. A generator creates the bi-dimensional patterns for the words in M1 list, and the Build Library module creates the corresponding library. Next, the normalized bi-dimensional input pattern is cross-correlated with the M1 selected dictionary patterns. The best match(es) corresponds to the solution(s).

Figure 2A:
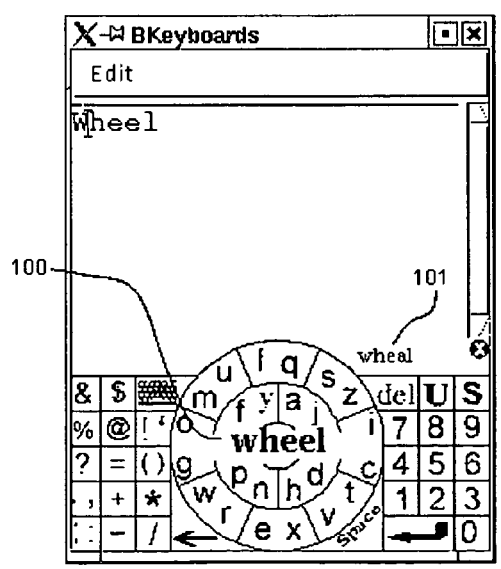
FIG. 2A illustrates the bi-dimensional input pattern corresponding to the word "wheel", as it is inputted on the keyboard of FIG. 1A, showing the first-choice solution at the center section of the keyboard, as well as in the text display above the keyboard and showing a second-choice solution in the upper right-hand section of the keyboard.
Figure 2B:
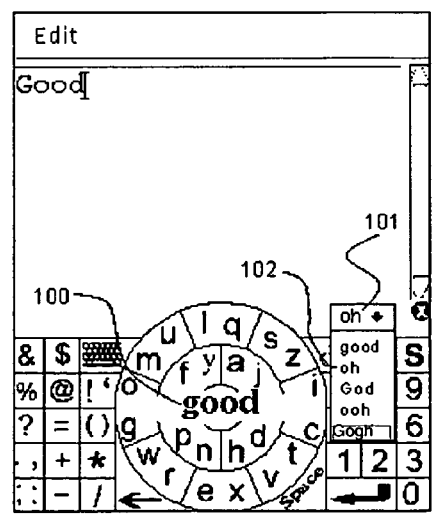
FIG. 2B illustrates the bi-dimensional input pattern corresponding to the word "good", as it is inputted on the keyboard of FIG. 1A, showing the first-choice solution at the center section of the keyboard (as well as in the text display above the keyboard) and showing additional non first-choice solutions in the upper right-hand section of the keyboard.

Up to ten solutions can be stored. Solutions having the same matching distance are arranged according their frequency probability. The first-choice solution (100) is preferably displayed in blue (or any other suitable color) and in large characters at the keyboard center (FIG. 2A), and the second choice solution (101) (if any) is displayed in red (or any other suitable color) with smaller characters at the top right of the keyboard (FIGS. 2A & 2B). Other solutions (when they exist) can be displayed by a tool-tip (102) located at the second solution location (FIG. 2B).

When the user lifts the input device, the first-choice solution is displayed in the text as well as on the keyboard center, as seen in FIGS. 2A–2B. When no solutions exist, the characters "??" are displayed on the text and on the first-choice solution location (100). When the user selects a solution other than the first choice solution, the first choice solution in the text is overwritten by the selected solution. This arrangement was designed in order to achieve maximum speed and accuracy. The user need not look at the text, but rather he simply checks that the first solution (displayed on the keyboard center) is the correct one. As soon as a new sliding motion is started, a space character is generated, and the first and second solution locations are cleared.

A cross-correlation program allows for the automatic elimination of a large portion of ambiguities that result from more than word having the same matching distance. Patterns are generated from a file containing the 5,000 most frequently used English words; said patterns are then cross-correlated with all of the patterns of the dictionary; and, when a dictionary pattern is similar to one of the patterns of the above file, it is deleted provided that the word corresponding to this pattern has a low frequency of use. The total number of possible remaining ambiguities of this type can be calculated in the following manner (this discussion is applicable to the preferred circular keyboard of the present invention having 13 keys, as previously described) 1) 45 ambiguities resulting from words having double letters such as: ("of", "off"), ("be", "bee"), ("in", "inn") . . . (these ambiguities are keyboard configuration independent); 2) 80 ambiguities due directly to the keyboard arrangement of letters into couples. For instance, couple bk has 5 ambiguities: (bind-kind); (kill-bill); (kills-bills); (billed-killed);

(lobbing-looking) (the couples have been designed so as to minimize partially such ambiguities). All these ambiguities have exactly the same pattern. There are also approximately 70 ambiguities resulting from word pairs that have similar paths. These include: (could-cold); (rule-role) etc . . . . The similarity between the bi-dimensional input patterns for the words "could" and "cold" can be seen in FIG. 3. These kinds of ambiguities can easily be controlled when the user takes some care in tracing the trajectories of those couples and are always avoided when working with the green-light mode. The total number of ambiguities is about 200. Among this, about 50 are of a high frequency of use: There are 30 ambiguities having exactly the same path and therefore which cannot be avoided: [(see,sex), (your,four), (yellow,fellow), (good,oh,God), (done,hope), (do,dog), (meet,met), (hear,dear), (dessert,desert), (quick,luck), (man,map), (next, net,pet), (week,web), (skin,skip), (soon,son), (to,too), (have, date,hate), (one,gone), (year,fear), (yet,feet), (staff,stay), (now,poor,nor), (west,rest), (had,dad), (head,dead), (been, keep), (new,per), (how,door), (never,Peter), (head,dead)]. There are 22 ambiguities with similar path having a high frequency of use. They are: [(she,see,sex) (which,rich) (could,cold) (very,try) (such,Smith) (take,tax) (five,face) (water,rather) (side,six) (services,series) (change,charge) (white, write) (changes,charges) (decision,design) (goes, ones) (contract,contrast) (present,president) (site, six) (rule, role) (accept,accident)(notice,provide)].

In all cases, the most probable choice is the one that is provided as the first-choice solution. The other solutions are preferably provided to the user as non first-choice solutions.

When the input pattern is a single point or when all the points of a sliding trajectory belong to a single key, the keyboard acts as a standard virtual keyboard and displays the symbol corresponding to this key. Capitalization is provided by a smooth sliding above the letter area without leaving the key area. When working with the green light mode with a plurality of letters per key, the user clicks anywhere in the key area, and, after a SPACE is clicked or/and a sliding motion is started, the system will disambiguate and recognize the word corresponding to the clicked keys. When working with the red light mode, the user has to click specifically above the desired letter.

Preferably, 28 ASCII characters (80) are provided on keys located at the right and left of the virtual keyboard, as seen in FIG. 1A and in FIGS. 2A–2C. When one of these keys is provided with more than one character, the secondary one can be selected by performing a smooth and directional sliding of the input device towards the secondary character. It is appreciated that other means could also be provided for selecting one out of two options for a single key.

It is appreciated that FIG. 1A represents the layout of the keyboard when the resolution of the screen is 240 pixels broad. When the resolution is 320 pixels or more, it is possible to include 3 characters per key. In that case, the total number of characters besides the alphabet itself that can be supported is 72. This figure can be doubled with the use of a Caps Lock key.

Preferably, 4 other functional keys are provided on the virtual keyboard:
1) "Delete Last Word" key. This function deletes the last word that was inputted. It is useful when a word is not recognized or if it is misidentified, or if the user made a mistake.
2) "Update" key. This function adds to the dictionary the last word written or a word in the created text that is selected by the user. The program checks that the word does not exist, and preferably warns the user when the word is very similar to another word in the dictionary.
3) "Suppress" key. This function deletes from the dictionary the last created word or a word from the created text that is selected by the user. The program first checks that the word exists and then suppresses it. This function is useful when a word is often misinterpreted with another word of the dictionary. The word may be suppressed for the present session of keyboard usage or permanently. Preferably, the word may be re-updated into the dictionary at any time.
4) The "Green light" key. This function serves speeds up the word-recognition process when the keyboard is used in a conventional, keystroke manner. The user can click anywhere on a given key without discriminating between the two characters belonging to the specified key. In one preferred embodiment, each time that a key is activated, a bullet is displayed at the top left keyboard area, and no printing is done on the text. When the user completes the word by clicking on space or by starting a sliding motion, the system re-creates the path corresponding to the keystroked word and performs recognition of the word.

Preferably, a Java, C or a Visual Basic program displays the virtual keyboard on the touch screen. The size of the keyboard depends on the handheld device resolution. For a 240*320 pixels screen, the keyboard dimension of FIG. 1A is 240*120 pixels and the user has free space available for the application running (email, editor, etc . . . ) of: 240*200 pixels. When the device has a better resolution, the keyboard dimension is increased to fit with this resolution. The program identifies the active window in which ASCII strings will be sent. Next, it calls the module which reads the dictionary and checks that it complies to the dictionary rules (class in increasing order, and given a class, curvilinear length in increasing order). If the dictionary file is not correct, the user is notified and the program is closed.

The sliding motion of the input device across the screen generates a bi-dimensional pattern which is entirely described by a number of coordinates (X,Y). The generated curve is displayed and it is erased as soon as the input device is lifted (when the curve is too large the beginning of it is erased in order to avoid overwriting on the keyboard). The program allows for the storage of the coordinates in vectors X(800),Y(800) and the number of points is stored in an integer called NPOINT. When NPOINT is greater than 800, the user is notified that he cannot exceed this value. This limit of 800 points is very high and allows for the creation of patterns of complex words at a very slow speed. When the input device is lifted, the NPOINT, X and Y arguments are sent to the Executable Module which returns the ASCII string corresponding to the solution. When no solutions is found the displayed string is "??". When multiple solutions exist, the above module returns the corresponding string of up to 10 solutions. As mentioned previously, the first-choice solution is displayed in a large blue label, located at the keyboard center (FIG. 2A) (100). A label in red is displayed at the top right of the keyboard (FIG. 2B) (101 & 102), displaying the other solutions. When the user ignores this label and starts a new word, the first choice selection is inputted into the text. However, when the user clicks on a non-first choice solution, the first choice solution is deleted and is substituted with the selected solution.

When the user starts to click or to slide in a region of the keyboard which does not correspond to a sliding area, the program does not react. However, when the user starts the sliding motion in an allowed area, the trajectory is preferably displayed and coordinates are stored. When the sliding area is left, the coordinates are not stored anymore, but the storing begins again when the input device comes back to the allowed area. This feature enables fast movement and words can be recognized even when the input device goes outside of and then returns to the sliding area.

Off-line corrections can be performed with ease. In one preferred embodiment, the user selects the word in the text that he wants to modify, and then, the next word created by a sliding motion or by keystrokes will be substituted with the selected word. The selected word can also be deleted using the backspace key, or updated in the dictionary or deleted from the dictionary.

Preferred embodiments for the virtual keyboard of the present invention will now be described in detail. Furthermore, the methodology through which the optimal keyboard layout was arrived at will be discussed.

The first parameter for the keyboard layout is the number of keys contained on the keyboard. If there is one key per letter of the alphabet, then there must be 26 keys (as far as the sliding area is concerned). Obviously, this type of keyboard cannot be made to be small because the keys have to be of a minimum individual size. In this case, the keyboard has almost the same area as the 6×5 key array keyboard, and thus the keyboard will function only slightly better than the 6×5 keyboard. The minimum number of possible keys is 1: all 26 letters of the alphabet for a single key. In this second case, the speed is maximum and, quite obviously, the number of ambiguities is also maximum because it includes all the words of the dictionary! The optimum solution is somewhere between these two options. Given a configuration of keys, an optimization program which will be detailed below allows for the optimization of the number of ambiguities as well as of the total curvilinear length of the most common used words. Three parameters N1, N2 and N3 allow for the evaluation of a keyboard. N1 is a total number of ambiguities when the 5,000 most common English words are cross-correlated to the dictionary. The smaller the value of N1, the fewer the number of possible ambiguities and the better the keyboard. N2 is the total curvilinear length of the above 5000 population. N2 is indirectly related to the number of keys. The smaller the N2 value, the better the input sliding speed possible. N3 represents the total number of keystrokes for the above population. The ideal solution is a compromise. When the number of keys decrease, the ambiguity number N1 increases and N2 and N3 will have better values.

Comparing the Atomik keyboard of FIG. 4B, with the 13 keys keyboard of FIG. 1A, the parameters for Atomik are N1=93; N2=2.6; N3=33977. Parameters for the 13 keys keyboard are: N1=269; N2=1.37, N3=32647. From this analysis, the 13-key keyboard is 100% more efficient that the Atomik keyboard, with a number of ambiguities remaining acceptable, (this figure does not take into account the sliding motion which avoids the use of the SPACE character which has a 16% frequency of use). Reducing the number of keys even more will increase the ambiguities number, and this would be appropriate only if the dictionary was smaller.

It is appreciated that 9, 10, 11 and 12 keys keyboards could be easily implemented using the same guidelines described in the following, with dictionaries of lower magnitude.

Both the 13 and 16-key keyboards (FIG. 1A and FIG. 1H, respectively) represent preferred embodiments of the present invention, though, as described above, the 13-key keyboard has certain advantages. It is appreciated, however, that the keyboard of the present invention may be designed with any suitable number of keys, depending on other considerations and requirements.

The second keyboard parameter is the arrangement of letters on the keys. For the 13-key keyboard, the letters should be organized into pairs or couples, in a manner so as to obtain the minimum number of possible ambiguities. A combinatory analysis is extremely time consuming and no computer will be able to cope with the problem in its generality. Therefore, to solve it, it was needed to separate the problem in two separate aspects: pairing of letter of the alphabet into couples and locating said couples onto the keyboard.

In order to find the 13 couples provide for the least number of ambiguities, the 5000-most common word list was employed. The number of possible ambiguities for each of the possible 26*26=676 letter couples was computed (as an example, in order to determine how many ambiguities the couple "a,b" have, the letter "b" is substituted for the letter "a" for all the words of the dictionary, and the number of words of the dictionary which are identical after the substitution is equal to the ambiguity number corresponding to couple "a,b"; next, the same is carried out when letter "a" is substituted with letter "b"). The solution is the arrangement (among all the possible combinations) of the 13 couples whose sum gives the minimum ambiguities.

The results of this method were:

| Couples | Ambiguities |
| --- | --- |
| aj | 1 |
| bk | 5 |
| ci | 2 |
| ex | 1 |
| fy | 8 |
| go | 10 |
| dh | 7 |
| lq | 0 |
| mu | 0 |
| np | 27 |
| rw | 22 |
| sz | 1 |
| tv | 10 |

The total number is 94 ambiguities.

The virtual keyboard of the present invention is preferably comprised of a plurality of concentric circles. Therefore, the next aspect of the keyboard to be determined is the number of concentric circles. If only one circle is used, then the shape will be exactly corresponding to the annulus of the Cirrin keyboard (40) (FIG. 1G), or a "cheese" configuration (not illustrated), in which each key represents a piece of a pie and the tip of each piece is situated at the center of the circle. The circumference would be 26 keys and all the benefit of a small area (and thus a faster sliding motion) will be lost. If four concentric circles are used, it is likely that the number of ambiguities will increase because the maximum path cross is 7 keys compared to 5 keys for three concentric circles. One solution is therefore two circles (FIG. 1E and FIG. 1F) and in this case the maximum path is four keys, however the area neighboring the center is ambiguous because all the keys corresponding to the inner circle are ambiguous. The other option is three circles (FIGS. 1A, 1H); in this case the maximum path is five keys, however the center is clearly defined. Thus, more preferably, the virtual keyboard has three concentric circles.

A further feature of the virtual keyboard is the rotation of the first inner circle with respect to the outer one. Different possibilities are illustrated in FIGS. 1B, 1C, and 1D. A phase displacement of 45 degrees (FIG. 1B) was found to be the best, as mentioned previously.

Yet another aspect of the virtual keyboard is the placement of the letter couples onto the keyboard. The optimal locations of the couples can be best resolved only when all the above parameters are defined: number of keys, couples determination, number of circles and relative position of circles. Then, a fast and efficient optimization program performs this task. Once the circular configuration is chosen, all keys are numbered from 1 to 13, as shown in FIG. 8. As an example, in order to go from key 6 to key 9, keys 2 and 3 have to be crossed, therefore paths 6-2-9 (a), 6-3-9 (b), are ambiguous with path 6-9 (c) (see FIG. 8). Supposing that key contains letter "a", key 1 contains letter "b" and key 9 contains "c". Each time that the user traces the path from a to c, combinations "abc" or "cba" will be ambiguous with "ac". Supposing now that key 6 contains couple "dh", key 1 contains couple "bk" and key 9 contains "ja". The total number of ambiguities for the path going from key 6 to key 10 is: "dbj" "jbd" "dba" "adb" "dkj" "jkd" "dka" "akd" "hbj" "jbh" "hba" "adh" "hkj", or 16 total ambiguities. In order to find a configuration minimizing the ambiguities, it is necessary to list all the possible segments that cause ambiguities. The total number is 54. The segments are listed below:

(6,1,10); (8,1,12); (7,2,1); (7,2,4); (7,2,11); (7,1,4); (7,1,11); (7,4,11); (2,1,4); (2,1,11); (2,4,11); (1,4,11); (9,3,1); (9,3, 5); (9,3,13); (9,1,5); (9,1,13); (9,5,13); (3,1,5); (3,1,13); (3,5,13); (1,5,13); (6,2,3); (6,2,9); (6,3,9); (2,3,9); (8,3,4); (8,3,1); (8,4,11); (3,4,11); (10,4,5); (10,4,13); (10,5,13); (4,5,13); (12,5,2); (12,5,7); (12,2,7); (5,2,7); (6,5,4); (6,5, 11); (6,4,11); (5,4,11); (8,2,5); (8,2,13); (8,5,13); (2,5,13); (10,3,2); (10,3,7); (10,2,7); (3,2,7); (12,4,3); (12,4,9); (12,3,9); (4,3,9).

A tri-dimensional integer array was created: j1(26,26,26). The dictionary was scanned and all trio combinations were counted and stored in the array j1. As an example, if after the scanning j1(3,5,12)=13, this means that 13 times the trio letter "cel" is detected. In order to find the final location of couples, all the factorial 13 combinations (i.e 13!=13*12*11* . . . *1) are tested. For each combination, the number of ambiguities is computed. When this number is below a given threshold the total curvilinear length of the 1000 most common words is computed (this computation takes into account the frequency of use for each word). The chosen configuration is the one which gives a number of ambiguities reasonable (but not minimum) with the shortest total curvilinear length (see layout of FIG. 1A).

The keyboard can be defined entirely using four parameters: the radius of the outer circle (R1), the radius of the middle circle (R2), and the radius of the inner circle (R3). (X0,YO) are the coordinates of the common center of the three circles. The radii were computed in order to get the same area for all keys. It is natural to use polar coordinates when working with a circular keyboard. In order to identify the key corresponding to coordinates (x,y), the radius and angle of this point was computed as follows: the radius equals the square root of (x2+y2); the angle equals the arctg(y/x). The radius value allows for the determination of which one of the three concentric circles a point is located, and the angle value allows for the determination of which key of the circle corresponds to the input point.

Three other keyboard arrangements will now be described that may be used with the system of the present invention.

The first keyboard is the 6×5 key array keyboard arrangement seen, two alternative types of which are illustrated in FIG. 4A and FIG. 4B. In both keyboards, there is a single letter per key. The keyboard is entirely defined by 3 parameters: length of a key (PADX), width of the key (PADY) (generally PADX=PADY), and (X0,Y0) coordinate of one of the corners of the keyboard. Cartesian coordinates are used to determinate a key. The abscissa and ordinates of a key corresponding to coordinates (x,y) is x/PADX and y/PADY (after a translation corresponding to X0,Y0).

It is appreciated that the ATOMIK keyboard shown in FIG. 4B has been previously used by Zhai and Kristensson (Zhai, S., & Kristensson P., (April 2003) "Shorthand Writing on Stylus Keyboard") in a system for shorthand aided rapid keyboarding, mentioned in the background section. In their system, the authors state that "to precisely cross all letters defining a word would require just as such, if not more, visual attention as serially tapping all the letter." (see page 2, column 1). It is appreciated that this statement is not true with the system of the present invention, for the following reasons: The preferred keyboard embodiment (FIG. 1A) has only 13 keys, in contrast to the ATOMIK keyboard, which has 30 keys. Once the user learns the layout of the 13-key keyboard, inputting a word using a unistroke motion becomes fast and easy. Furthermore, the sliding area is 2.3 smaller than of the ATOMIK keyboard, and therefore the average sliding path is reduced in a corresponding manner. The present invention also has the advantage that even when strong distortions occur in the inputted pattern, the system can still recognize the inputted word. Additionally, when the input device leaves the text input area and is then returned, the unistroke motion is continued. Using the "green light" function of the keyboard, the user's transition from novice to expert is gradual and smooth.

Figure 5:
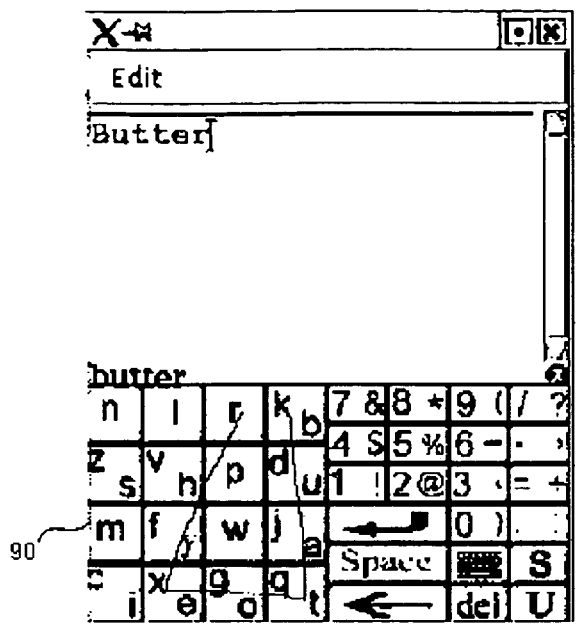
FIG. 5 illustrates a schematic drawing of a 4×4 key array keyboard system and the bi-dimensional input pattern for the word "butter". The first-choice solution for the inputted word is displayed preferably on the upper left hand side of the keyboard as well as in the text display above the keyboard.

The second keyboard is a 4×4 key array keyboard (90), shown in FIG. 5. This keyboard has a total of 10 alphabetic keys having letter pairs and 6 alphabetic keys having single letters. It is appreciated that the sliding area for this keyboard comprises only the 16 keys which contain alphabetic characters. The parameters and method to find a key are equivalent to the 6×5 keyboard. FIG. 5 shows the bi-dimensional input pattern for the word "butter" using the 4×4 keyboard. This example also illustrates that for many commonly-used words, the user can easily learn a recognizable gesture for achieving a very fast input rate. It is appreciated that while said keyboard provides for a better text input speed than both the 6×5 keyboards, and the standard QWERTY keyboard, the circular keyboard of FIG. 1A is nonetheless even more preferable, since the circular shape serves to further reduce the number of keys as well as the average curvilinaer length.

Figure 6A:
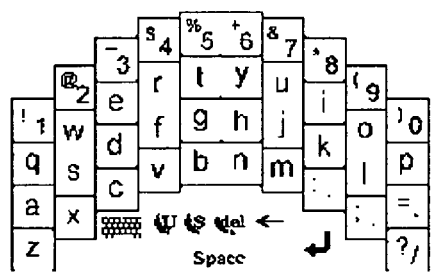
FIG. 6A illustrates a schematic drawing of an arc-shaped QWERTY keyboard.
Figure 6B:
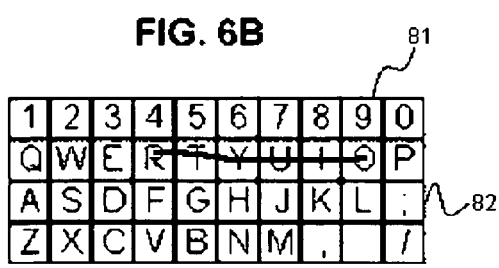
FIG. 6B and FIG. 6C illustrates the bi-dimensional input pattern for the words "or" and "our" on the standard QWERTY (FIG. 6B) and arc-shaped QWERTY (FIG. 6C) keyboards.
Figure 6C:
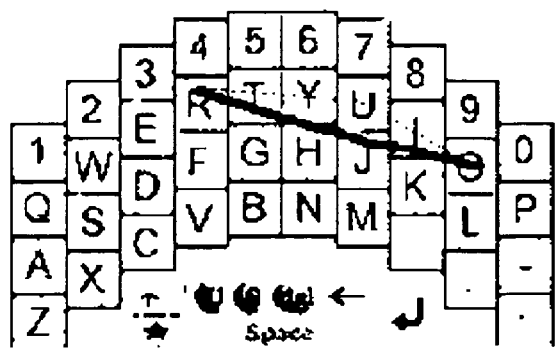

The third keyboard is the well-known QWERTY keyboard, shown in FIGS. 6A–6C. It is appreciated that the sliding area for the QWERTY keyboard comprises only those keys containing alphabetic characters and does not include keys containing numbers or symbols. For example, in the standard QWERTY keyboard of FIG. 6B, the non-sliding area (81) comprises the top row of the keyboard and the sliding area (82) comprises the lower three rows of the keyboard. The keyboard is preferably modified so as to have a convex or arc-shaped (see FIG. 6A) curvature or a concave (not shown), generally "U"-shaped curvature. The curvature may be set to any appropriate degree, though it is recognized that as the curvature increases (resulting in fewer ambiguities), the keyboard will take up more area. The curvature serves to significantly reduce the number of possible word ambiguities, as seen in FIGS. 6B and 6C. Using the standard QWERTY keyboard of FIG. 6B, it is impossible to determine whether the intended inputted word is "or" or "our". Using the arched keyboard of FIG. 6C, it becomes possible to distinguish the two input patterns from one another.

For the QVVERTY keyboard, a symbol location is defined by an abscissa: II (ranging from 1 to 10) and an ordinate: JJ (ranging from 1 to 4). As an example, the coordinates of the symbol "K" is (8,3). The center (XX,YY) of a symbol key having coordinates (II,JJ) is computed by the following code which is used to generate a pattern from a word.

```
CodeA
PI = 3.1416
XX = (I1-1)*PADX + PAD_ORX
    IF I1 < 5 THEN
       ALPHA = (I1-1)*PI/8.
    ELSE
       ALPHA = (10 -I1)*PI/8.
    ENDIF
YY = PAD_ORY -(JJ-1-Q_KEY*SIN(ALPHA))*PADY
``` where (XX,YY) are the computed coordinates of the center of the key. PADX and PADY are the dimension of a key. PAD_ORX and PAD_ORY are the origin of the keyboard. Q_KEY is the convexity coefficient. Q_KEY=0 corresponds to the standard keyboard; Q_KEY>0 corresponds to a convex arc-key shape keyboard; Q_KEY<0 corresponds to a concave arc-key shape keyboard, seen in FIG. 6A.

In principle, the greater the convexity (or concavity) of the keyboard, the better the discrimination. However, the free space remaining for the other applications (namely the created text space) will decrease as the curvature is increased. For Q_key=2, the keyboard requires 240*157 pixels, and the space remaining is 240*163 pixels (for a usual PDA). This is preferably the default setting of the system, though the user can easily change this option and choose a standard keyboard, or a concave or convex arc shape keyboard with an amplitude that can be changed.

The following code allows for the extraction from a geometrical point (XX, YY, the corresponding symbol key coordinates (I1,J1).

```
CodeB
I1 = (XX -PAD_ORX)/PADX + 1.
    IF I1< 1 THEN I1 = 1
    IF I1> 10 THEN I1 = 10
    IF I1<5 THEN
       ALPHA = (I1-1)*PI/8
    ELSE
       ALPHA = (10 -I1)*PI/8.
    ENDIF
J1 = (PAD_ORY-YY)/PADY + 1. + QKEY*SIN(ALPHA)
    IF J1<1 THEN J1 = 1
    IF J1>4 THEN J1 = 4
```

The following code allows for the computation, from a geometrical point (XX, YY) and from the corresponding symbol coordinates (I1,J1) computed as above, of symbols neighboring (I1,J1) which are candidates to match the (XX, YY) geometrical point as well. This code is used to evaluate once an intermediary letter is detected whether there are neighbors which can be also candidates. FIG. 7B illustrates the code.

```
CodeC
I3 = 0
I4 = 0
QX = (I1-1)*PADX + PAD_ORX
QY = PAD_ORY - (J1-1-Q_KEY*SIN(ALPHA))*PADY
IF I1>1 AND XX<QX-TOL THEN I3 = -1
IF I1<10 AND XX>QX+TOL THEN I3 = 1
IF J1>1 AND YY>QY+TOL THEN I4 = -1
IF J1<4 AND YY<QY-TOL THEN I4 = 1
```

TOL is a tolerance, I3=0, means no neighbor in the abscissa direction; i3=1 right neighbor, i3=−1 left neighbor. I4=0 means no neighbor in the ordinate direction, i4=−1 top neighbor, i3=1 below neighbor).

FIG. 7B illustrates, in a QWERTY keyboard, how a plurality of neighboring keys can be selected as intermediate keys. Nine scenarios are illustrated. In the example shown, the intermediate point corresponding to the intermediate letter is located in the key symbol G. The square area corresponding to the tolerance is at the center of this key. When the point is located inside this area, G is the only candidate as far as this point is concerned. When the point abscissa is inside the tolerance area while the ordinate is above, then aside from G, T is also a letter candidate. When the point abscissa is inside the tolerance area while the ordinate is below, then aside from G, the letter B is also a candidate. When the point abscissa is at the right of the tolerance area while the ordinate is above, then aside from G, the letters T, Y, and H are also candidates (and so on . . . ) The keyboard as detailed above is very flexible. Its magnitude and origin can be changed by changing only four parameters (PADX, PADY, PAD_ORX and PAD_ORY), and symbols can be easily changes as well. Concavity and convexity can be controlled by the Q_KEY parameter. Parallax errors within the tolerance are automatically corrected.

It is appreciated that the above codes also work for a 6×5 and 4×4 keyboards. The corresponding codes dealing with the circular keyboard of FIG. 1A are similar but use polar coordinates instead of Cartesians coordinates.

Figure 7A:
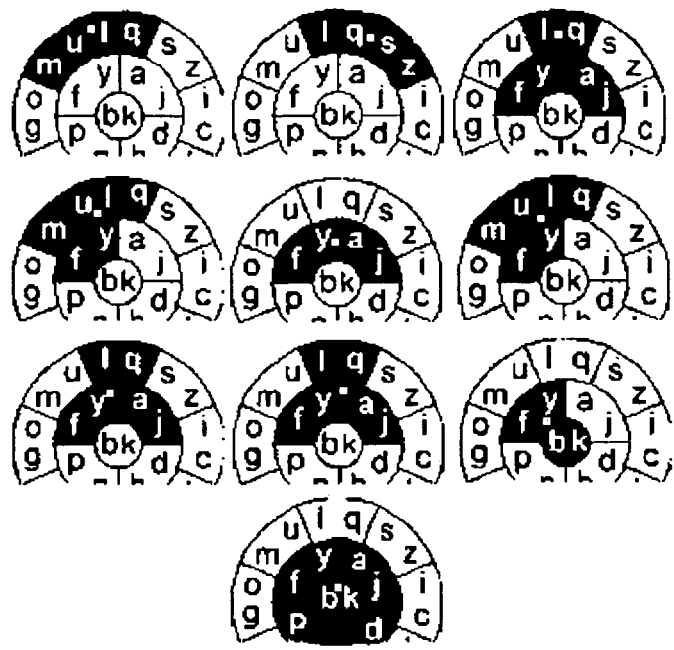
FIG. 7A illustrates a schematic drawing of an example of the intermediate letters selection process for the keyboard of FIG. 1A.
Figure 7B:
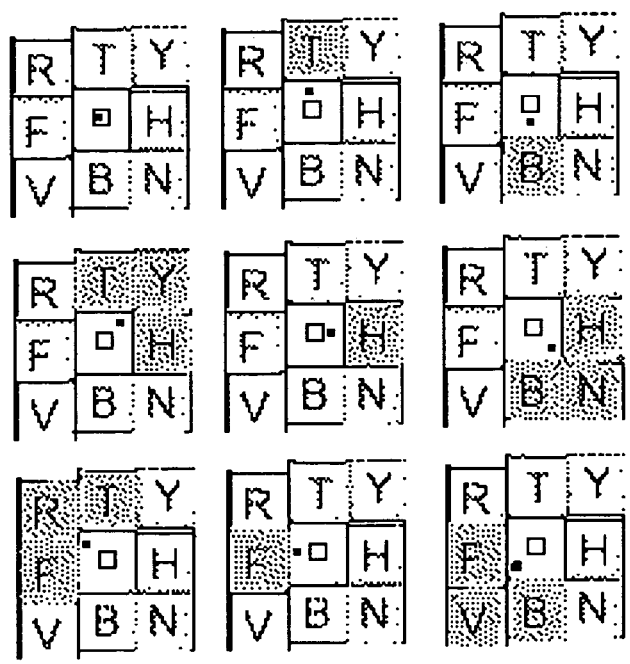
FIG. 7B illustrates a schematic drawing of an example of the intermediate letters selection process for the arc-shaped QWERTY keyboard of FIG. 6A.

FIG. 7A illustrates an example of the intermediate keys selection process for the keyboard of FIG. 1A. Nine different scenarios are illustrated. In each case, the marked point represents an intermediate letter location, as determined using the above method. The shaded area represents those keys which are considered as representing possible intermediate letter candidates for the inputted word using said point. As seen in the Figure, depending on the precise location of the point, up to three keys are to be considered for said candidates. This is with the exception of the last scenario, where the point is located substantially at the center of the inner circle, in which case, all letters represented by the inner circle and the middle circle are to be considered as possible intermediate letter of the inputted word.

When a bi-dimensional input pattern (or single keystroke) is generated on the virtual keyboard, the Executable module is called from the Visual Programming tool program. The module input is NPOINT,XX(800),YY(800) where NPOINT is the number of points generated by the user motion and XX, YY are the corresponding coordinates in pixels. The module output is: N_SOLUTION number of solutions; SOLUTION(10) is a string containing the recognized words; and IFIN(10) is an integer array which gives the numbers of characters corresponding to string SOLUTION(10). When a word is not recognized the returned SOLUTION(1) string is "??",with IFIN(1)=2. When a single key is clicked, then IFIN(1)=1, and SOLUTION(1) is a single character string, which corresponds to the symbol of the clicked key. When NPOINT=1 or when NPOINT>1 but all the (XX,YY) points are concentrated on a single key the module returns the corresponding symbol, and no further processing is done.

A Douglas, Peucker line simplification algorithm is used in order to reduce the number of points and eliminate redundant points of the bi-dimensional input pattern. An example of this is illustrated in FIGS. 9A–9C, in which the bi-dimensional input pattern for the word "future" is shown as it is input on the keyboard (FIG. 9A) and before (FIG. 9B) and after (FIG. 9C), the simplification is carried out. The original pattern shown in FIG. 9B has 343 points, whereas the simplified pattern in FIG. 9C has just 6 points. This step is required not only in order to speed up the process, but to avoid false interpretation of intermediate letters due to local noise. A good reduction algorithm is a one which gives a number of points equal or smaller to the number of letters (smaller because some letters could be aligned). Parameters NPOINT, XX and YY now describe the simplified bi-dimensional pattern.

The next step is the determination of the first and last key of the bi-dimensional pattern, found by looking to the extremity points: (XX(1),YY(1)) and (XX(NPOINT), YY(NPOINT)). The filtering process is then carried out by eliminating all the words of the corresponding dictionary class, to which parameters: LEN1(curvilinear length), LEN2 (maximum length between two points), (I_1(minimum abscissa) and I_2(maximum abscissa) for QWERTY and 6×5 keyboards) do not match, up to a tolerance the corresponding parameter values of the input pattern. At this stage, M0 is the number of selected words. When M0=0, there are no solutions and the process is stopped. When M0<10 the bi-dimensional input pattern is cross-correlated with the M0 pattern generated candidates. All the matching distances which are below a predetermined threshold are possible solutions. This process will be described further below.

When M0>10 intermediate letters are taken into account and act as an additional filter. A point of the input bi-dimensional pattern which is greater than 1 and smaller than NPOINT corresponds to an intermediate letter only when the angle it produces with the previous and next points is smaller than 1.40 rd. This angle is large enough in order to avoid wrong identification of intermediate letters due to noise. In principle the line simplification algorithm has suppressed noises, however as an additional security a point may correspond to an intermediate letter only when the segments which joined the point with the previous point and with the next point are greater than a certain tolerance level.

Let L=the number of intermediate letters of the input pattern. For each intermediate letter, there are N1 candidate (i is the index of the intermediate letter, in the range [1,L]). Then, the total number of combinations is therefore M=M0* (N1*N2* ... NL). As an example, if M0=2000, L=3 and each L intermediate letters have 3 candidates, then M=2000* (3**3)=54,000. This number is too large and not compatible with real time computation, and therefore, the maximum value allowed for M is 25,000. This means that L needs to be reduced. For each of M possibilities, the program eliminates all the dictionary words which do not contain the L intermediate letters in the same order. This filter considerably reduces the number of candidates while having a very high probability of keeping the correct solution (because of the large tolerance). The tolerances allow for real time computation while having a very high recognition ratio, since for each intermediate letter, the user can make a reasonable mistake on the key location and the word will still be recognized (See FIGS. 7A & 7B). The longer the word, the higher the probability for this word to have intermediate letters, and thus the more efficient is the filter.

At this stage, when M<=100, the final recognition is done as described above (M0<10 case). When M>100, an additional selection is required (this statistically happens in 4% of cases). In this case, the program looks for the word candidate which has the closest curvilinear length with respect to the input pattern curvilinear length. If N is the index of this specific word candidate in the list, then N−70 candidates which have from this word a curvilinear length smaller and the N+29 candidates which have from this word a curvilinear length greater are selected. When N−70<1 the selection is [1,100], and when N+29>M, the selection is [M−99,M]. Since the curvilinear lengths are ranged in increasing order within each class of the dictionary, this selection is done extremely fast. The reason why 70 and 29 are chosen instead of 50 and 50 is because of the noise introduced in the trajectory by the user, the probability that the solution has a shorter curvilinear length than the input pattern is larger than the opposite situation.

The recognition system, is a powerful system for pattern recognition of a bi-dimensional pattern. It works for a broad variety of patterns, (OCR, handwritten recognition, planes, car, silhouettes, maps, and many others), it is space invariant, and it can identify part(s) of patterns, composite patterns, distorted patterns, discriminate patterns according to localized details, etc . . . . In the present invention, only a very simplified part of the global system is required, for the following reasons: there are no rotation, translation, scaling or specific distortions between the input bi-dimensional pattern and the generated candidate patterns; both the bi-dimensional input pattern and the generated patterns are translated with respect to their center of mass and they can be directly compared; patterns by definition are composed with a single sub-pattern; there are no composite patterns; finally, no recognition of sub-part of patterns is required. A whole word is compared to another whole word and it is not necessary to compare whether an input word is a sub-part of a larger word.

The simplified system is composed with two units: 1) The BuildLibrary Unit, which functions to create a library composed of the selected generated patterns; 2) The Recognition Unit, which functions to cross-correlate the input pattern with all the elements of the working library. The following is a description of these two units, as they apply to the present invention.

Build Library Unit Description:

This Unit is based on the mathematical definition of the monotonicity (Guttman, L. Coefficients of polytonicity and monotonicity. Encyclopedia of Statistical Sciences, N.Y.: John Wiley & Sons, Inc., 1986, 7, 80–87.

Guttman, L. What is not what in statistics. The Statistician, 1977, 26, 81–107) whose definition is:

Given N pairs of observations $\{(x_i, y_i); i=1,2, \ldots, N\}$ on two numerical variables x and y, the coefficient of monotonicity $\mu_2$ between x and y is defined as follows:

$$\mu_2 = \frac{\sum_{i=1}^{N}\sum_{j=1}^{N}(x_i-x_j)(y_i-y_j)}{\sum_{i=1}^{N}\sum_{j=1}^{N}|x_i-x_j||y_i-y_j|}$$

Intuitively, this coefficient tells us how much the two variables vary in the same sense, since the quantities $(x_i-x_j)$ and $(y_i-y_j)$ express the respective progressions of the variables x and y.

Figure 10A:
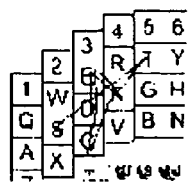
FIGS. 10A–10E illustrate schematic drawings of the segmentation of the bi-dimensional input pattern for the word "defects" into monotonous segments.
Figure 10B:
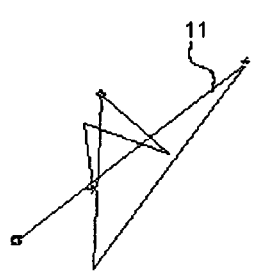
Figure 10C:
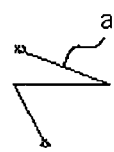
Figure 10D:
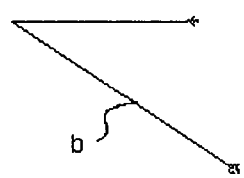
Figure 10E:
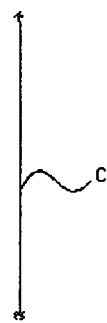

The original and powerful idea is to apply this coefficient for a set of coordinates $\{(x_i, y_i); i=1,2, \ldots, N\}$, which describes a generated pattern. The aim is to segment the pattern into a number of monotonous segments. An example is shown in FIGS. 10A–10E, in which the bi-dimensional generated pattern for the word "defects" (11) (FIGS. 10A and 10B) is segmented into three monotonous segments: FIG. 10C (segment a), 10D (segment b), and 10E (segment c). In each of those segments, all the ordinates will be in a strictly increasing (or decreasing order). This idea is powerful when applied to pattern recognition, for two reasons: 1) fast and efficient filtering; when an input pattern will not satisfy the same criteria of monotonicity as the one of the library candidates with which it is compared, the library candidate is eliminated; 2) easy computation of the matching area; it is very easy to compute the area between two segments which are monotonous within the same interval because there is a one to one correspondence between each pair of points (with the exception of possible small oscillations of the input pattern).

The segmentation of a pattern into monotonous segments is a fast process. When N is a number of points of a pattern the number of steps which are requested are: Nstep=LOG (N−1)/LOG(2)+1. A loop starting from 1 to Nstep is created. Let $n_1$ be the first point and $n_2$ the last point of a sub-segment obtained during the loop execution (for the first step of the loop we have the entire pattern $n_1=1$ and $n_2=N$). The above defined coefficient $\mu_2$ is computed and optimized in the interval $(n_1, n_2)$ for each sub-segments. The optimization is done as a function of a rotation angle $\alpha$. When there is no angle for which the coefficient $\mu_2$ is below a threshold value, this means that $n_2$ is too large and the next step having lower $n_2$ value is executed. When $\mu_2$ is below the threshold value, the next step with a greater $n_2$ value is executed. The process stops in a maximum of NSTEP steps. When $n_2<N$, the process starts again in order to define the next monotonous segment the starting point is $n_2=n_1$ and $n_2=N$. When there is more than one value of a which satisfies the monotonicity, the chosen value is the one which gives the greatest interval:

$$|(Y_{n_2}-Y_{n_1})\cos(\alpha)-(X_{n_2}-X_{n_1})\sin(\alpha)|$$

This provides the largest amplitude of the extremity ordinates of the sub-segment. When this stage is completed, the pattern is inversed and the same process is executed. Average values are computed. When $\mu_2$ is smaller than the tolerance but not zero, the pattern is idealized in order to get a strict monotonicity. A library element is defined with the following parameters:

NSEG: Number of monotonous segments $n_1, n_2 \ldots N_{NSEG-1}$: Index of boundaries $\alpha_1, \alpha_2 \ldots \alpha_{NSEG}$ angles of rotation N number of points of the library element $(XL_i, YL_i, i=1, N)$ coordinates of the library element The constitution of the library is a fast process and hundreds of elements can be computed and stored in much less than 1 second on a PDA 200 Mhz platform.

Recognition Unit Description

This module functions to compute the normalized matching distance between an input pattern and a given library element. The very first step is to look whether the input pattern satisfies the same monotonicity of the candidate library element (can the input pattern be segmented in the same number of monotonous segments?) In order to answer this question a normalized ordinate belonging to the interval [−1,1] is defined as follows:

$$T_{ij}=(YL_i \cos(\alpha_j)-XL_i \sin(\alpha_j)+TR_j)/E_j$$

wherein i is the library element point index, j is the monotonous segment index: j ∈ [1, NSEG] wherein $TR_j=[(XL_{nj+1}+XL_{nj})\sin(\alpha_j)-(YL_{nj+1}+YL_{nj})\cos(\alpha_j)]/2$ $$E_j=[(YL_{nj+1}-Y_{nj})\cos(\alpha_j)-(XL_{nj+1}-XL_{nj})\sin(\alpha_j)]/2$$

wherein $(XL_{nj}, Y_{lnj})$; $(XL_{nj+1}, YL_{nj+1})$ are the first and last coordinates of the $j^{th}$ segment.

When j=NSEG, then $n_{j+1}=N$ (N is the number of points of the library element). When j=1 then $n_j=1$. It is easy to see from the definition of $T_{ij}$ that when an input pattern point $(X_i, Y_i)$ is equal to the first point of a monotonous segment $(XL_{nj}, Yl_{nj})$ then Tij=−1 and when $(X_i, Y_i)$ is equal to the last point of a monotonous segment, $(XL_{nj+1}, YL_{nj+1})$ then $T_{ij}=1$.

The module which controls the monotonicity computes, for each point of the input pattern, the $T_{ij}$ values. According to those values two possibilities can occur: 1) the pattern, as far as a candidate library element is concerned, does not satisfy the monotonicity and the candidate is rejected, or; 2) the monotonicity is satisfied the exact boundaries points of the pattern are computed and the pattern is divided into NSEG segments which will be matched with the corresponding segments of the library candidate. This segmentation is done up to a certain tolerance level, so that small oscillations are permitted (but sanctioned).

Figure 11A:
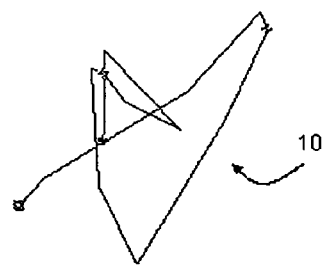
FIGS. 11A–11E illustrate schematic drawings in the determination of the matching distance between a bi-dimensional input pattern and a library candidate pattern (generated pattern).
Figure 11B:
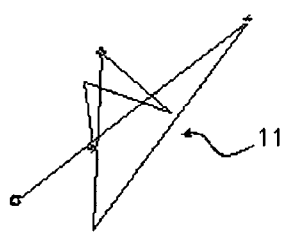
Figure 11C:
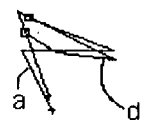
Figure 11D:
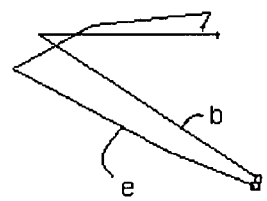
Figure 11E:
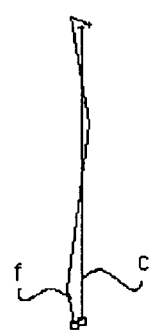

This process is clearly seen in FIGS. 11A–11E, in which the input bi-dimensional pattern for the word "defects" (see FIGS. 10A–10E as well), and the monotonous segments generated from said pattern are compared with a pattern element, and its monotonous segments, generated from a library candidate. FIGS. 11A and 11B are the patterns for the inputted word (10) and the library candidate (11), respectively. In FIGS. 11C–11E, the three monotonous segments of the bi-dimensional input pattern (d, e, f) for the inputted word are compared with the three monotonous segments of the monotonous segments generated from the library candidate pattern (a, b, and c).

The last step is to compute the matching area. This computation is relatively simple because each point of the input pattern corresponds to a unique point of the library element. In case of (small) oscillations, no negative areas are computed but the oscillation increases the matching area. When some $T_{ij}$ are outboundaries, this means that $T_{ij}$j<−1 or $T_{ij}$>1, a penalization area is computed. When the normalized ordinates of the first and last points of a pattern monotonous segment are not exactly equal to −1 (for the first point) or 1 (for the last point), a penalization is computed. Once the area is computed, a normalized matching coefficient M is computed:

$$M=C*\text{Area}/(\text{length}\_p*\text{length}\_l)$$

wherein C is a constant, Area is the total matching area corresponding to all the monotonous segments, length_p is the input pattern curvilinear length and length_l is the library element curvilinear length. When M=0 the match is perfect. The constant was set in such a way that when M>0.2 the candidate element is rejected. The library element having the best score is the solution, and when the other solutions are in the range: M<0.2, those solutions corresponds to other choice solutions.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A reduced keyboard system for text input on an electronic device, comprising;
   (a) a virtuat keyboard comprising a plurality of keys;
   (b) an input device associated with said virtual keyboard, wherein text input is performed by placing said input device onto the virtual key of said keyboard that corresponds to the first character of a word, sliding said input device to subsequent virtual keys corresponding to subsequent characters of a word, and lifting said input device from said virtual keyboard so as to produce a bi-dimensional input pattern, and;
   (c) a dictionary database associated with said virtual keyboard, said dictionary database comprising a plurality of classes wherein each of said classes contain words that have first and last letters corresponding to predetermined keys of said virtual keyboard;
   wherein said bi-dimensional input pattern is used in order to determine the identity of the inputted word at least partially based on mathematical monotonous comparisons between said bi-dimensional input pattern and a temporary library of patterns generated from words contained within possible classes of said dictionary database to which the inputted word belongs such that inputted words are identified based on whole-word recognition.

2. A reduced keyboard system according to claim 1, wherein the keyboard has any QWERTY arrangement.

3. A reduced keyboard system according to claim 2, wherein the keyboard has a concave curvature.

4. A reduced keyboard system according to claim 2, wherein the keyboard has a convex curvature.

5. A reduced keyboard system according to claim 1, wherein the keyboard has a 6×5 key array arrangement.

6. A reduced keyboard system according to claim 1, wherein the keyboard has a 4×4 key array arrangement.

7. A reduced keyboard system according to claim 1, wherein at least one of said keys of said keyboard contains at least two characters.

8. A reduced keyboard system according to claim 1, wherein the keyboard comprises a plurality of concentric circles.

9. A reduced keyboard system according to claim 8, wherein the keyboard comprises 13 keys, and wherein the concentric circles comprise an outer circle having 8 keys, a middle circle having 4 keys, and an inner circle having one key.

10. A reduced keyboard system according to claim 9, wherein each of said keys corresponds to two characters of the alphabet.

11. A reduced keyboard system according to claim 8, wherein the keyboard comprises 16 keys, and wherein the concentric circles comprise an outer circle having 10 keys, a middle circle having 5 keys, and an inner circle having one key.

12. A reduced keyboard system according to claim 1, wherein words belonging to a specific class of said dictionary database are ordered according to curvilinear length.

13. A reduced keyboard system according to claim 1, further comprising means for segmenting the bi-dimensional input pattern into monotonous segments.

14. A reduced keyboard system according to claim 1, further comprising means for applying a line simplification algorithm to said bi-dimensional input pattern.

15. A reduced keyboard system according to claim 1, further comprising means for computing the matching distance between the bi-dimensional input pattern and patterns generated from a plurality of words to the dictionary database class to which the inputted word belongs.

16. A reduced keyboard system according to claim 1, further comprising means for determining possible intermediate letter candidates of the inputted word.

17. A reduced keyboard system according to claim 16, wherein said means for determining possible intermediate letter candidates allows for input errors.

18. A reduced keyboard system according to claim 1, further comprising means for allowing the user to use the keyboard as a conventional keystroke keyboard.

19. A reduced keyboard system according to claim 1, further comprising means for allowing the user to use the keyboard as a conventional keystroke keyboard, wherein at least one key of said keyboard comprise two characters and wherein a bi-dimensional input pattern is generated from the keys which are keystroked during the input of a word for enabling word recognition and disambiguation.

20. A method for text input on an electronic device, using a reduced virtual keyboard associated with said electronic device, said method comprising;
   (a) placing an input device onto the virtual key of a reduced virtual keyboard that corresponds to the first character of a word, sliding said input device to subsequent virtual keys corresponding to subsequent characters of said word, and lifting said input device from said virtual keyboard so as to produce a bi-dimensional input pattern;
   (b) applying at least one mathematical filter to said bi-dimensional input pattern;
   (c) determining key characteristics of said bi-dimensional input pattern possibly including, but not limited to, possible first and last letters of the inputted word, possible intermediate letters of the inputted word, and curvilinear length of at least a portion of the bi-dimensional input pattern;
   (d) providing a dictionary database associated with said virtual keyboard, said dictionary database comprising a plurality of classes wherein each of said classes contain words that have first and last letters corresponding to predetermined keys of said virtual keyboard and generating a temporary library of bi-dimensional patterns corresponding to words found in dictionary classes to which the inputted word could possible belong based on Step (c);
   (e) comparing said bi-dimensional input pattern with said temporary library of bi-dimensional patterns in order to identify at least one solution for the inputted word based on whole-word recognition, wherein said comparison is performed at least partially based on monoto nous segments comparisons and best matching distance determination.

21. A method according to claim 20, wherein words belonging to a specific class of said dictionary database are ordered according to increasing or decreasing curvilinear length.

22. A method according to claim 20, wherein step (b) comprises applying a line-simplification algorithm to said bi-dimensional input pattern.

23. A method according to claim 20, wherein said determining possible intermediate letter candidates of the inputted words allows for input errors.

24. A method according to claim 20, wherein the virtual keyboard has a QWERTY arrangement.

25. A method according to claim 24, wherein the keyboard has a concave curvature.

26. A method according to claim 24, wherein the keyboard has a convex curvature.

27. A method according to claim 20, wherein at least one of the keys of said virtual keyboard contains at least two characters.

28. A method according to claim 20, wherein the keyboard comprises a plurality of concentric circles.

29. A method according to claim 28, wherein the keyboard comprises 13 keys, and wherein the concentric circles comprise an outer circle having 8 keys, a middle circle having 4 keys, and an inner circle having one key.

30. A method according to claim 29, wherein each of said keys corresponds to at least two characters of the alphabet.

31. A method according to claim 28, wherein the keyboard comprises 16 keys, and wherein the concentric circles comprise an outer circle having 10 keys, a middle circle having 5 keys, and an inner circle having one key.

* * * * *